Patented Sept. 26, 1933

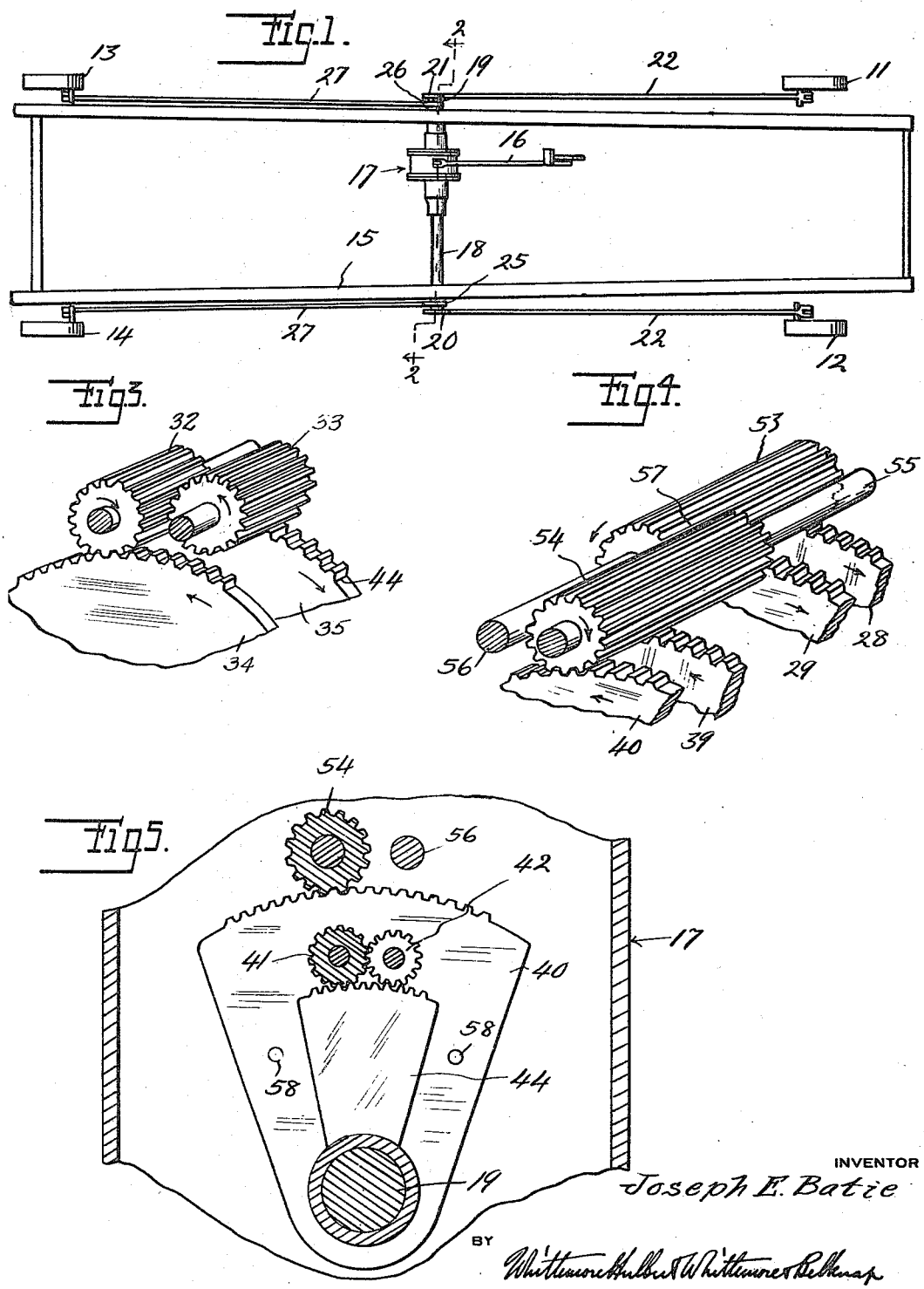

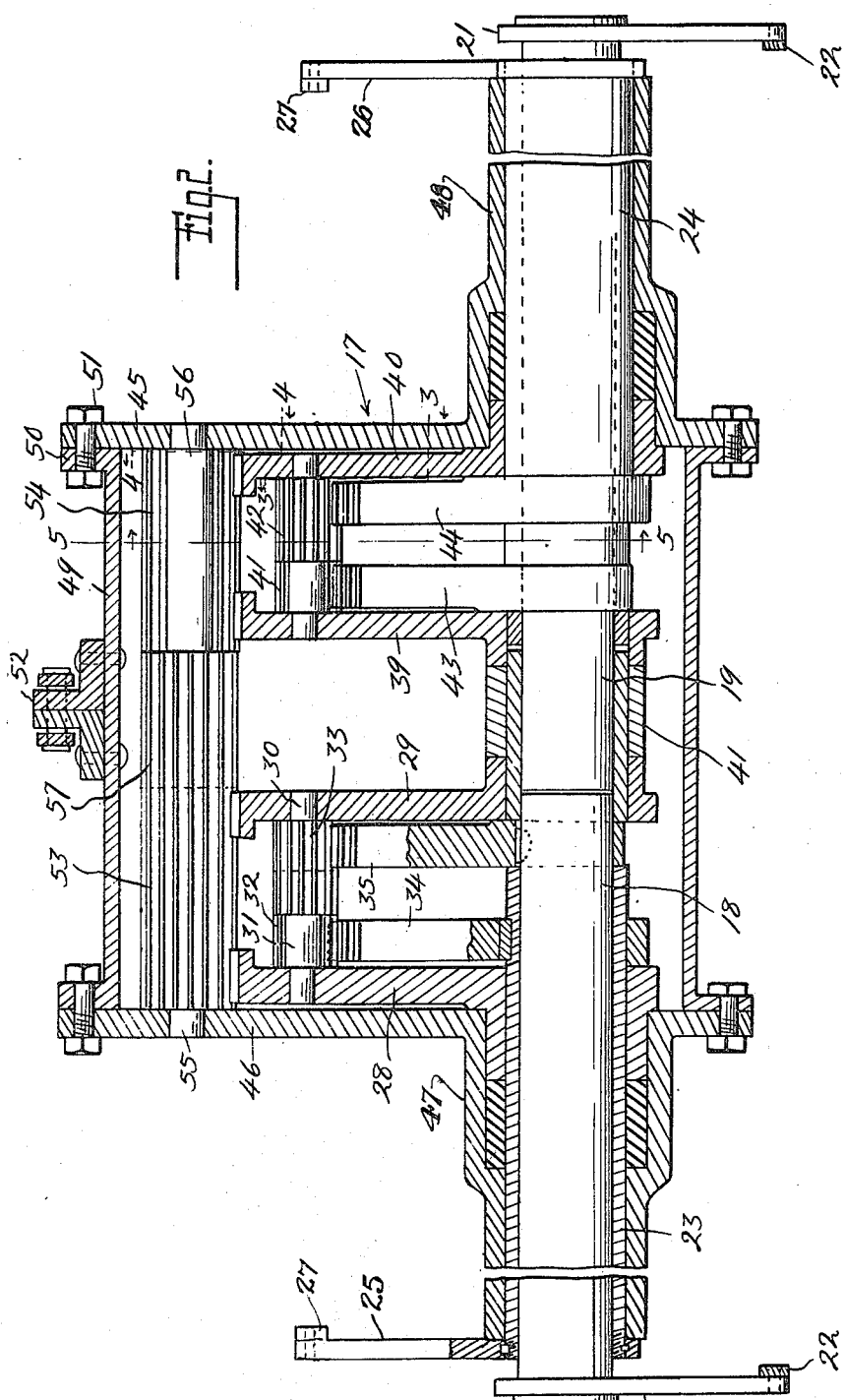

1,928,475

UNITED STATES PATENT OFFICE 1,928,475

BRAKE ACTUATING MECHANISM

Joseph E. Batie, Detroit, Mich., assignor to Kelsey-Hayes Wheel Corporation, Detroit, Mich., a corporation of New York Application March 3, 1930. Serial No. 432,785

11 Claims. (Cl. 188—204)

This invention relates to vehicle brake systems in which a plurality of wheel brakes are operated from a common actuating member and has as one of its objects to simplify, render more efficient and improve generally braking systems of the multiple brake type.

While the present invention may be used in connection with brake systems comprising various numbers of brakes, it finds particular utility for use with a brake system having a plurality of groups of brakes each comprising a plurality of brakes and to this end the invention consists more in detail in the provision of an equalizing device operable to not only equalize the braking force applied to the various groups of brakes but also to equalize the force applied to each individual brake.

A still further object of this invention is to obtain the foregoing advantages with a comparatively simple construction of mechanism and one which requires no adjustment.

Other objects of this invention reside in the peculiar construction of the equalizing mechanism and the manner in which the same functions to equalize the braking pressure applied to each brake. The foregoing as well as other objects will be more fully set forth as description proceeds, especially when considered in connection with the accompanying drawings, wherein:

Figure 1 is a diagrammatic plan view of a vehicle chassis equipped with a multiple brake system constructed in accordance with this invention.

Figure 2 is a sectional view taken on the plane indicated by the line 2—2 of Figure 1.

Figure 3 is a sectional perspective view taken substantially on the line 3—3 of Figure 2.

Figure 4 is a sectional view taken on the line 4—4 of Figure 2.

Figure 5 is a sectional view taken on the line 5—5 of Figure 2.

Referring now to the drawings, it will be noted that there is illustrated diagrammatically in Figure 1 a multiple or four wheel brake system comprising a pair of front brakes 11 and 12 and a pair of rear brakes 13 and 14 mounted upon a chassis 15 of any suitable design in accordance with the usual practice. The above mentioned brakes are preferably of the expanding type and are each suitably connected to a single control element 16 conveniently located upon the chassis for actuation by the operator. The arrangement is preferably such that actuation of the control element 16 simultaneously effects an operation of each brake in the system.

While multiple or four wheel brake systems of the type briefly outlined above have achieved considerable recognition in the trade in a comparatively short times and are universally employed on motor vehicles now commercially produced, nevertheless, difficulty has been experienced in providing simple and efficient mechanism for equalizing the braking pressure exerted upon each individual brake of the system irrespective of slight variations occurring in the system due to wear or manufacturing inaccuracies. This is especially true of the so called mechanical brake system of the type illustrated herein wherein the various brakes are operatively connected to a single control element by mechanical means for actuation thereby. To this end the present invention contemplates the provision of a simple and efficient equalizing device which, as will be presently set forth, not only functions to equalize the braking pressure applied to the various groups of wheel brakes, but also operates to equalize the braking force applied to each individual brake of the system irrespective of slight variations in the latter.

One form of equalizing device found particularly satisfactory for accomplishing the above results is illustrated in Figure 2 of the drawings by the reference character 17 and comprises a pair of axially arranged rockshafts 18 and 19 extending transversely of the chassis and having the opposite end portions thereof journaled in the side sill members of the frame in any suitable manner. The aforesaid end portions of the shafts 18 and 19 have secured thereto suitable levers 20 and 21, respectively, which are in turn connected to the front wheel brakes by means of the rods 22. Surrounding the shafts 18 and 19 and capable of rotation relative thereto is a pair of sleeves 23 and 24 arranged coextensive with each other and having secured to the opposite ends thereof suitable levers 25 and 26 which in turn are connected to the rear brakes 13 and 14, respectively, of the vehicle by means of the rods 27. While in the above description it has been stated that the rock-shafts 18 and 19 are connected to the front brakes of the vehicle and the sleeves 23 and 24 are connected to the rear brakes and while this combination is frequently referred to throughout the remaining part of the description, it should be understood that this arrangement is for the purpose of illustration only since various combinations may be resorted to without altering the efficiency or operation of the equalizing device in any way.

In order to establish an equalizing connection between the rockshaft 18 and the sleeve 23 so that the front brake 11 and corresponding rear brake 13 will be actuated in unison upon prior operation of the control element 16, I provide the following construction. Freely rotatably mounted upon the sleeve 23 in spaced relation to each other is a pair of gear segments 28 and 29 connected together by means of a pair of shafts 30 and 31 having the axes thereof arranged substantially parallel to the axes of the sleeve and rockshafts and having the end portions thereof journaled in aligned circumferentially spaced openings formed in the gear segments 28 and 29 adjacent the peripheries thereof. Arranged within the space between the segments and secured respectively to the shafts 30 and 31 are the pinions 32 and 33 having the inner end portions meshing with each other and adapted to mesh with a pair of spaced gear segments 34 and 35 also disposed within the space between the segments 28 and 29 and secured to the sleeve 23 and rockshaft 18, respectively, as clearly shown in Figure 2 of the drawings.

Referring now to the operation of the mechanism as thus far described and assuming that the gear segments 28 and 29 together with the pinion 32 are rotated in a clockwise direction, it will be observed that the pinion 33 will be rotated in a counter-clockwise direction with the result that the gear segments 34 and 35 will impart rotation to the sleeve 23 and rockshaft 18 in counter and clockwise directions, respectively, as will be apparent from Figure 3. With the foregoing arrangement in mind and assuming further that the resistance offered to the rotation of the rockshaft 18 by the associated front wheel brake 11 is greater than the resistance offered to the rotation of the sleeve 23 by the rear brake 13 connected thereto, or in other words that the front brake surface contacts with the drum before the rear brake surface, it will be observed that the gear segment 35 secured to the rockshaft and meshing with the pinion 33 will tend to resist rotation with a force corresponding to the difference in the resistance offered by the two brakes 11 and 13. As a consequence, the pinion 33 rotates around the gear segment 35 without actually rotating the latter. The resistance offered to the rotation of the gear segment 34 being less causes the latter to rotate until such time as the brake 13 connected to the sleeve 23 offers substantially the same resistance to rotation as the front brake 11. When this condition arises, both segments 34 and 35 will be rotated as a unit by the pinions 32 and 33. Thus it will be observed that the rockshaft 18 and sleeve 23 are differentially connected for actuation as a unit and by virtue of this differential connection the braking force applied to each of the front and rear brakes 11 and 13 is substantially equal or, in other words, these brakes are equalized at all times irrespective of any slight variations occurring in the system.

The rockshaft 19 and sleeve 24 extending coaxially with the shaft 18 and sleeve 23 are differentially connected to apply equal force to the front and rear brakes 12 and 14 in substantially the same manner as the brakes 11 and 13 as clearly set forth above. In detail a second pair of gear segments 39 and 40 corresponding to the gear segments 28 and 29 are rotatably mounted upon the sleeve 24 in spaced relation to each other and normally held in spaced relation to the segments 28 and 29 by means of a spacer 41 surrounding the sleeve 24. The gear segments 39 and 40 carry pinions 41 nad 42 arranged in intermeshing relation and adapted to mesh with suitable gear segments 43 and 44 which in turn are secured to the rockshaft 19 and sleeve 24, respectively. The operation of this latter construction is substantially the same as the one hereinbefore set forth with the exception that it will be assumed for reasons to be presently described that the gear segments 39 and 40 are rotated as a unit in a counter-clockwise direction and that the pinion 41 is also rotated in a counter-clockwise direction with the result that the pinion 42 meshing with the pinion 41 rotates in a clockwise direction. Thus when considering that the gear segments 43 and 44 are arranged to mesh with the pinions 41 and 42, respectively, it will be understood that the segment 43 will be moved in a clockwise direction and the pinion 44 in a counter-clockwise direction and since, as pointed out above, the segments 43 and 44 are secured respectively to the shaft 19 and sleeve 24, the latter members will be rotated in clockwise and counter-clockwise directions, respectively, similar to their corresponding parts 18 and 23 as will be apparent in Figure 3 of the drawings. The differential movements of the shaft 19 and sleeve 24 to equalize the braking pressure upon each of the brakes 12 and 14 is identical to the differential movement pointed out in connection with the brakes 11 and 13 and accordingly it is not believed necessary to repeat the operation at this point.

As will be apparent from Figure 2 of the drawings, the differential mechanism for connecting the rockshafts 18 and 19 with the sleeves 23 and 24, respectively, is enclosed by a suitable housing 45 having side walls 46 provided with axially aligned bearing portions 47 and 48 surrounding the portions of the sleeves 23 and 24 and forming supports therefor. The side walls 46 of the housing are preferably connected to each other by means of a detachable end wall 49 having annular flanges 50 secured to the peripheral portions of the side walls by means of the securing elements 51. The housing 45 is preferably connected to the control element 16 by means of the connection designated generally by the reference character 52 whereby actuation of the control element effects a rotation of the housing about the axes of the rockshafts 18 and 19.

In order to establish an operative connection between the housing and differential mechanism hereinbefore described for actuating the brakes I provide a pair of spaced pinions 53 and 54 mounted upon the spaced shafts 55 and 56, respectively, which in turn are journaled in the end walls 46 of the housing adjacent the periphery of the latter. The pinions 53 and 54 are arranged in intermeshing relation as indicated by the reference character 57 and the pinion 53 is adapted to mash with both the gear segments 28 and 29 while the pinion 54 is adapted to mesh with both the gear segments 39 and 40. Referring now to the operation of this latter mechanism and assuming that the housing 45 and the pinion 53 are rotated in a counter-clock wise direction, it will be observed that the pinion 54 will rotate in a clockwise direction with the result that the segments 28, 29 and 39, 40 will rotate in the directions hereinbefore set forth and designated by the arrows in Figure 4 of the drawings. Assuming now for the purpose of illustration that the brakes 11 and 13, indirectly actuated by the gear segments 39 and 40 operate prior to the brakes 13 and 14 or, in other words, offer a greater resistance to the actuation of the rockshaft 19 and sleeve 24 than the resistance offered by the segments 28 and 29 to the rotation of the shaft 18 and sleeve 23, it will be observed that the pinion 54 will merely rotate around the segments 39 and 40 without actually effecting rotation of these gear segments. As a consequence, the pinion 53 will be rotated in a clockwise direction to rotate the gear segments 28 and 29 until the resistance offered by the two sets of brakes 11, 13 and 12, 14 is substantially equal, at which time both the individual brake units will be actuated simultaneously to effect the braking action with the result that the braking force applied to both groups of brakes will be equalized. In this connection it is to be further noted that the gear segments 28, 29 and 39, 40 are normally prevented from running off the pinions 53 and 54 by the end wall 49 of the housing. In order to prevent similar action of the gear segments 34, 35 and 43, 44, I provide stops 58 upon the gear segments 28, 29 and 39, 40 and arranged in the path of movement of the gear segments upon opposite sides of the gear 34, 35 and 43, 44 to limit movement thereof in opposite directions.

Thus from the foregoing it will be observed that I have provided an efficient equalizing device wherein differential gearing is employed for equalizing the braking force applied to each pair of brakes and also to each individual brake in the system. It will further be observed that I have accomplished this result with a simple construction of mechanism requiring no adjustment and also one which is compact in construction and inexpensive to manufacture since substantially all of the parts may be formed from a stamping operation.

While in describing the present invention particular stress has been placed upon the association of the equalizing mechanism with a four wheel brake system, it should be understood that the same may be utilized with equal facility in connection with brake systems comprising various numbers of brakes and accordingly reservation is made to make such changes as may come within the purview of the accompanying claims.

What I claim as my invention is:

1. In a brake system, the combination with a plurality of brakes and a common actuating member therefor, of means operatively connecting said brakes to the member aforesaid including, a pair of telescopically engaging shafts connected to the brakes and mounted for relative rocking movement, a pair of toothed elements secured respectively to each of said shafts, a second pair of toothed elements journaled upon the outer shaft on opposite sides of the toothed elements aforesaid and projecting radially beyond the same, pinions arranged between the second pair of toothed segments and journaled thereon, said pinions having portions meshing with each other and having other portions meshing respectively with the first named elements, a planet gear meshing with both the second mentioned toothed elements, and means for actuating said planet gear upon operation of the member aforesaid to effect an operation of said shafts through the pinions and first mentioned toothed elements.

2. In a brake system, the combination with a plurality of brakes and a common actuating member therefor, of means operatively connecting said brakes to the member aforesaid including, a pair of telescopically engaging shafts connected to the brakes and mounted for relative rocking movement, a pair of toothed elements secured respectively to each of said shafts, a second pair of toothed elements journaled upon the outer shaft on opposite sides of the toothed elements aforesaid and projecting radially beyond the same, means connecting the outer portions of said last mentioned toothed elements together including a pair of pinions arranged in the space between the second mentioned toothed elements and journaled thereon for rotation about the axes of the shafts, said pinions arranged to mesh with each other and respectively with each of said first mentioned toothed elements, a housing enclosing the toothed elements and pinions aforesaid and having a portion journaled upon the outer shaft, a connection between the member aforesaid and housing operable to rotate the latter upon actuation of said member, and a planet gear carried by the housing and meshing with the second mentioned toothed elements for operating the same to rock said shafts through the pinions and first named toothed elements.

3. In a brake assembly, the combination with a plurality of brakes and a common actuating member therefor, of means operatively connecting the brakes to the member aforesaid including, a pair of shafts respectively connected to a pair of brakes and mounted for independent rocking movement, means for rocking the shafts and for equalizing the action thereof including a pair of toothed elements secured respectively to the shafts, a second pair of toothed elements mounted for rotation relative to the toothed elements aforesaid, a pair of pinions carried by the said second pair of toothed elements and rotatable about the axis of said first mentioned toothed elements, said pinions having portions meshing with each other and having other portions respectively meshing with the first named toothed elements, and means for actuating the said toothed elements to effect a rocking movement of the shafts including a planet gear meshing with both of said second mentioned toothed elements and rotatable about the axis of the first mentioned toothed elements upon operation of said brake actuating member.

4. In a brake system having a plurality of brakes, the combination of a pair of rockshafts respectively and independently connected to certain of the brakes, differentially operable means connecting said shafts including a toothed element secured to each shaft, a pair of pinions mounted for movement about the axes of the shafts, said pinions having portions meshing with each other and having other portions respectively meshing with the toothed elements for actuating the same, a second pair of rockshafts respectively and independently connected to certain other of said brakes, and differential means operable independent of the means aforesaid for connecting said second pair of shafts.

5. In a brake system having a plurality of brakes, the combination of a pair of rockshafts respectively and independently connected to certain of the brakes, differentially operable means connecting said shafts including a toothed element secured to each shaft, a pair of pinions mounted for movement about the axes of the shafts, said pinions having portions meshing with each other and having other portions respectively meshing with the toothed elements for actuating the same, a second pair of rockshafts respectively and independently connected to certain other of said brakes, differentially operable means for connecting said second pair of shafts, and common means for simultaneously actuating both of said differentially operable means and for equalizing the action thereof.

6. In a brake system having a plurality of brakes, the combination of a pair of rockshafts having a common axis and respectively and independently connected to certain of the brakes, differentially operable means connecting the shafts including toothed segments secured to each shaft in axial spaced relation, a pair of pinions mounted for movement about the axis of the shafts, said pinions having portions meshing with each other and having other portions respectively meshing with the toothed segments for operating the latter, a second pair of rockshafts respectively and independently connected to certain other of the brakes, differential means similar to the differential means aforesaid for connecting the second pair of shafts, and common means for simultaneously actuating both of said differentially operable means and for equalizing the action thereof.

7. In a brake system having a plurality of brakes, the combination of a pair of rockshafts having a common axis and respectively and independently connected to certain of the brakes, differentially operable means connecting the shafts including toothed segments secured to each shaft in axial spaced relation, a second pair of toothed segments mounted for rocking movement about the axis aforesaid, a pair of pinions carried by the second pair of segments, said pinions having portions meshing with each other and having other portions respectively meshing with said first mentioned toothed segments for operating the latter, a second pair of rockshafts respectively and independently connected to certain other of the brakes, differential means similar to the differential means aforesaid for connecting the second pair of shafts, and pinions having portions meshing with each other and having other portions meshing with the segments carrying the intermeshing pinions of both the aforesaid differential means for actuating the latter simultaneously and for equalizing the action thereof.

8. In a brake system having a plurality of brakes, the combination of a pair of rockshafts mounted for rocking movement independent of each other and respectively connected to certain of the brakes, differentially operable means connecting said shafts for controlling the rocking movement thereof to equalize the brakes connected thereto, said means including a pair of toothed elements respectively and operatively connected to each shaft, a second pair of rockshafts respectively and independently connected to certain other of the brakes, differentially operable means connecting said second pair of rockshafts for controlling the rocking movement thereof to equalize the brakes connected thereto, said last-mentioned means also including a pair of toothed elements respectively and operatively connected to each of said second-mentioned shafts, and means for equalizing the action of both of said differential means and for effecting a rocking movement of both pairs of shafts, said means including a pair of pinions having portions meshing with each other and having other portions respectively meshing with the pairs of toothed elements aforesaid.

9. In a brake system having a plurality of brakes, the combination of a pair of rockshafts respectively and independently connected to certain of the brakes, differentially operable means connecting said shafts including a gear segment secured to each shaft, a pair of pinions mounted for movement about the axes of the shafts, said pinions having portions meshing with each other and having portions respectively meshing with the gear segments for actuating the same, a housing for the differentially operable means, and means carried by said housing for moving said pinions about the axes of the shafts.

10. In a brake system, the combination of a plurality of brakes and a common actuating member, of means operatively connecting said brakes to the member aforesaid including, a pair of rockshafts operatively connected to the brakes and mounted for relative rocking movement, a pair of toothed elements secured respectively to each of said shafts, a second pair of toothed elements mounted for rotation relative to the toothed elements aforesaid and arranged upon opposite sides of the latter, pinions arranged between the second pair of toothed elements and journaled upon the latter, said pinions having portions meshing with each other and having other portions respectively meshing with the first named elements, a planet gear meshing with both the second mentioned toothed elements, and means for actuating the planet gear upon operation of the common actuating member aforesaid to effect a rocking movement of said shafts.

11. In a brake system having a plurality of brakes, the combination of a pair of rockshafts respectively and independently connected to certain of the brakes, differentially operable means connecting the shafts including toothed elements secured to each shaft, a second pair of toothed elements mounted for rocking movement relative to the toothed elements aforesaid and arranged upon opposite sides of the latter, a pair of pinions carried by the second named toothed elements, said pinions having portions meshing with each other and having other portions respectively meshing with the first mentioned toothed elements for operating the same, a second pair of rockshafts respectively and independently connected to certain other of the brakes, differential means similar to the differential means aforesaid for connecting the second pair of shafts, pinions having portions meshing with each other and having other portions meshing with the toothed elements carrying the intermeshing pinions of both the aforesaid differential means whereby rotation of the same as a unit equalizes the operation of both differential means, and means connected to the last named pinions for actuating the same.

JOSEPH E. BATIE.